United States Patent [19]

Yokogawa et al.

[11] Patent Number: 4,860,271
[45] Date of Patent: Aug. 22, 1989

[54] SERVO CIRCUIT FOR GENERATING A TRACKING ERROR SIGNAL FOR OPTICAL DISK PLAYER

[75] Inventors: Fumihiko Yokogawa; Hiroyuki Hirano; Akira Motoyama, all of Saitama, Japan

[73] Assignee: Pioneer Electronic Corporation, Tokyo, Japan

[21] Appl. No.: 167,284

[22] Filed: Mar. 11, 1988

[30] Foreign Application Priority Data

Mar. 13, 1987 [JP] Japan .................................. 62-59747
Sep. 18, 1987 [JP] Japan ................................. 62-234438

[51] Int. Cl.⁴ ............................................... G11B 7/00
[52] U.S. Cl. .................................................... 369/44
[58] Field of Search ...................... 358/342; 250/201; 369/43-47, 105, 106, 109, 124, 111; 346/108, 76 L

[56] References Cited

U.S. PATENT DOCUMENTS 4,364,118 12/1982 Maeda et al. ................... 358/342 X
4,707,816 11/1987 Yonezawa et al. .............. 369/105 X
4,748,609 5/1988 Yonezawa et al. .............. 369/105 X

FOREIGN PATENT DOCUMENTS 58-185051 10/1983 Japan .

*Primary Examiner*—Robert L. Richardson
*Attorney, Agent, or Firm*—Sughrue, Mion, Zinn, Macpeak & Seas

[57] ABSTRACT

A servo circuit for use in an optical disk player or the like, which can track a disk having a large eccentrically without abnormal sampling of the RF signal produced as a result of scanning the disk. The servo circuit according to this invention comprises a first comparator for comparing RF signals from a pair wobbled pits on a optical disk and generating a difference signal indicating the level difference between the AF signals; a holding means for holding the difference signal for a predetermined period; a reference level producing circuit for setting reference levels having a predetermined width with the level of a previously sampled difference signal of the holding means as a center; a second comparator for comparing the level of a presently sampled difference signal of the first comparator with the reference level and outputting a first signal indicative of the comparative result; and a selector for selecting and outputting, as a tracking error signal, either the presently sampled difference signal and a second signal having a level within the predetermined width of the reference level in accordance with the comparative result. The presently sampled difference signal is selected when the level of the presently sampled difference signal is within the reference level and the second signal is related when the presently sampled difference signal is out of the reference level.

7 Claims, 5 Drawing Sheets

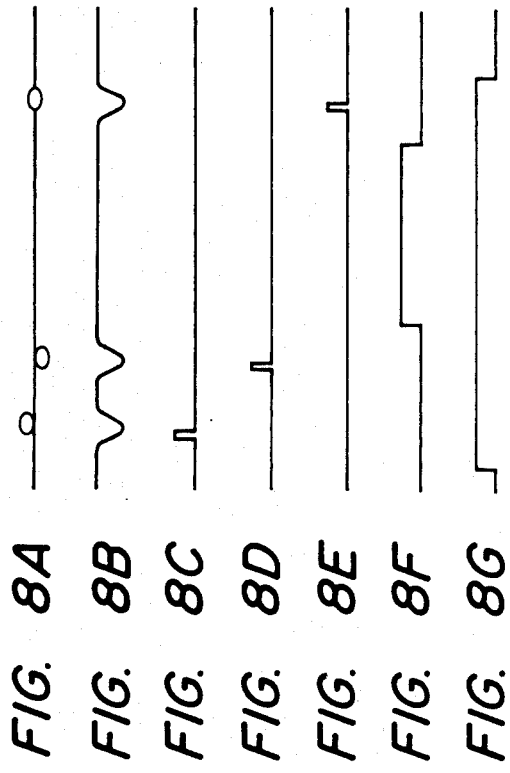
FIG. 8A
FIG. 8B
FIG. 8C
FIG. 8D
FIG. 8E
FIG. 8F
FIG. 8G
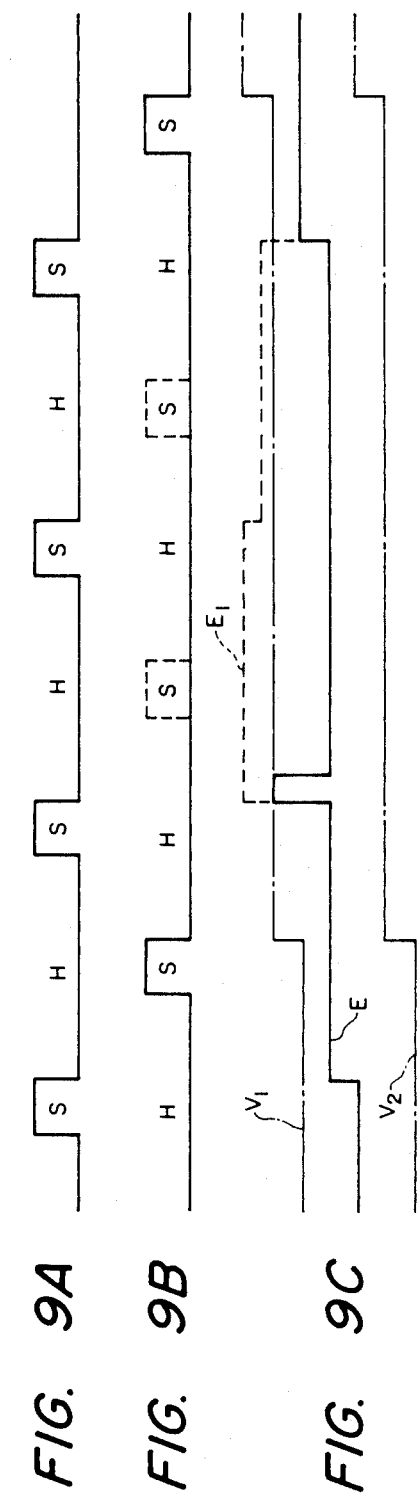
FIG. 9A
FIG. 9B
FIG. 9C

SERVO CIRCUIT FOR GENERATING A TRACKING ERROR SIGNAL FOR OPTICAL DISK PLAYER

BACKGROUND OF THE INVENTION

The present invention relates to a servo circuit suitable for use in an optical disk player or the like.

FIG. 2 indicates a servo byte pattern of a sample servo employed in an optical disk player. Each sector of the optical disk is made up of 43 servo blocks, in which one servo block is composed of two servo bytes followed by 16 data bytes. Each servo byte is formed by two wobbled pits and one clock pit. The two wobbled pits are disposed to the right and left with respect to the track center. Thus, when the pickup (data detecting light spot) traces the track center, the amount of light reflected from the right and left wobbled pits decreases equally. Displacement of the tracing position in the rightward or leftward direction changes the relative amounts of light reflected from the two wobbled pits corresponding to the direction of displacement and the distance of displacement. A tracking error signal can be produced from the difference between the amounts of light reflected from the pairs of wobbled pits, as indicated by the level difference between the RF signal in the two regions, and is employed in the following data byte region.

The arrangement of the two wobbled pits is varied so that a longer interval and a shorter interval between the two wobbled pits are alternately changed at every 16 tracks. Thus, the detection of the change in the interval between the pairs of wobbled pits makes it possible to accurately count the number of tracks (16-track counting), even during high speed search operations.

The distance D between the rearward wobbled pit and the clock pit is set to a specific length which does not appear in the data bytes. Therefore, this distance D can be detected and used as a synchronizing signal, and various timing signals produced on the basis of the detected synchronizing signal. Clock pulses are produced corresponding to the detection signals of clock pits. A mirror-surface portion of the distance D is a focusing area in which a focus error signal is detected and employed during the following data byte region.

In an optical disk player for such an optical disk, a tracking servo loop switch is rendered open when the level of the tracking error signal exceeds a predetermined reference level in order to protect the tracking actuator. Alternatively, a limiter switch may be rendered ON to limit the level of the tracking error signal so that no error signal above a predetermined level is outputted.

FIG. 1 is a circuit diagram showing a prior art level detector which operates as a protection limiter switch. As shown in the figure, an error signal is applied to the actuator (not shown) and to a window comparator 1. The window comparator 1 compares the error signal with an upper limit reference level $V_1$ and a lower limit reference level $V_2$, and outputs an alarm signal when the error signal is above the reference level $V_1$ or below the reference level $V_2$. In response to the alarm signal, a protection switch is actuated.

However, since the reference levels $V_1$ and $V_2$ are set to large values, and hence the protection operation is not frequently effected, the actuator is driven by a large level error signal. Therefore, a quick detection of the error signal cannot be accomplished. Moreover, it takes considerable time to return to a normal condition. Consequently, an effective protection operation cannot be carried out with the prior art device.

Further, when a tracking error signal is produced upon sampling a level difference of the RF signal corresponding to the two wobbled pits, the sampled value is abnormal if there are defects in the wobbled pits or if there is dust in the vicinity of the wobbled pits. Therefore, in the prior art device, the sampled value is compared with a reference value. When the sampled value is above the reference value, the previously sampled value is held as it is. With such a prior art device, the reference value must be set to a relatively large value in order to enable tracking or a largely eccentric disk. Setting the reference value to a large value adversely results in the sampling of abnormal values so that the tracking servo cannot be achieved in defective servo byte regions. On the other hand, if the reference value is set to a small value, the track of an eccentric disk cannot be traced accurately.

SUMMARY OF THE INVENTION

The present invention has been made in view of the foregoing, and an object of the invention is to quickly and surely carry out the protection operation.

Another object of the invention is to provide a accurately tracking circuit which is capable of tracking even a largely eccentric disk, in which abnormal sampling of the level difference of an RF signal corresponding to two wobbled pits is not performed.

In order to achieve the above objects, the present invention provides an improved servo circuit which comprises a sample-and-hold circuit for sampling an input error signal and holding the sampled signal; a first timing signal generation circuit for generating a timing signal and outputting the timing signal to the sample-and-hold circuit to cause the sample-and-hold circuit to perform a sampling-and-holding operation; a second timing signal generation circuit for generating a reference signal corresponding to the signal held by the sample-and-hold circuit; a comparator for comparing the input error signal with the reference signal; and a switch controlled in response to an output of the comparator.

In operation, the error signal is inputted to the sample-and-hold circuit, which samples and holds the error signal in response to a timing signal generated by the first timing signal generation circuit. The second timing signal generation circuit generates the reference signal corresponding to the signal being held by the sample-and-hold circuit, and the comparator compares the error signal with the reference signal. The switch is operated in response to the comparison results.

BRIEF DESCRIPTION OF THE DRAWINGS

In the drawings:

FIGS. 8A–8G and 9A–9C show waveforms of the various signals in the circuit of FIG. 3;

DESCRIPTION OF THE PREFERRED EMBODIMENTS

A preferred embodiment of the present invention will now be described with reference to the accompanying drawings.

Figure 3:
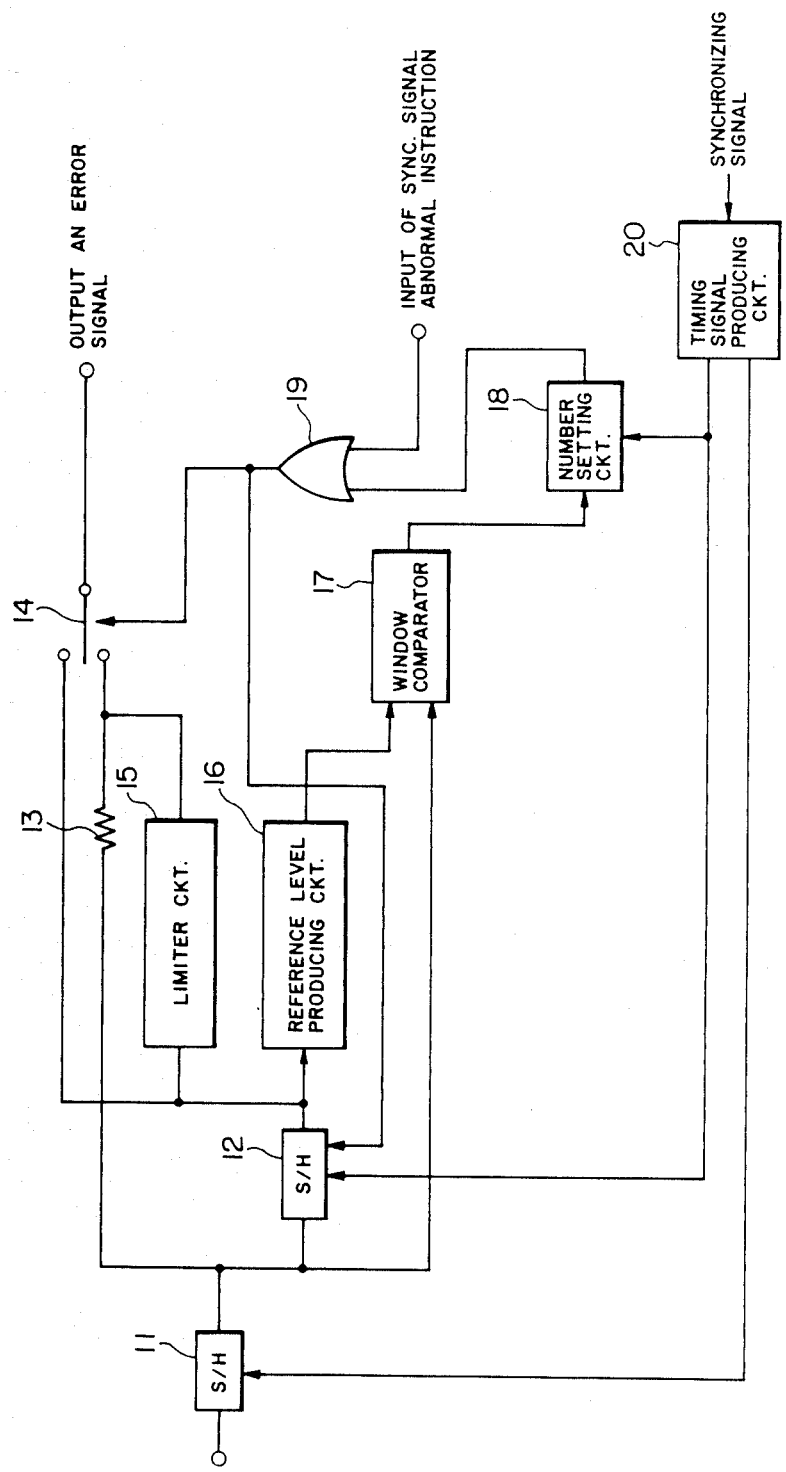
FIG. 3 is a block diagram showing a servo circuit according to the present invention.

FIG. 3 is a block diagram showing a servo circuit according to a first embodiment of the invention. An RF (radio frequency) signal picked up from an optical disk is applied to a first S/H (sample-and-hold) circuit 11 which functions as a tracking error signal producing circuit. When an optical spot traces a servo byte region as shown in FIG. 8A, the level of the RF signal decreases in the pit positions, as shown in FIG. 8B.

Upon detection of sync signals, a timing signal producing circuit 20 produces various timing signals, as shown in FIGS. 8C through 8G, based on the sync signal as a reference. The timing signals shown in FIGS. 8C through 8E correspond to a wobbled pit and a clock pit of the servo byte. The timing signals shown in FIGS. 8F and 8G correspond to a focus area and the servo byte region, respectively. In the first S/H circuit 11, the level of the RF signal is sampled each time one of two timing signals corresponding to the wobbled pit are inputted, and a difference signal between the two sampled levels of the RF signal is produced and outputted therefrom as a tracking error signal. The tracking error signal thus produced is held by the first S/H circuit 11 until two wobbled pits in the subsequent servo byte region are traced. The tracking error signal produced by the first S/H circuit 11 is applied to the input of a second S/H circuit 12.

Figure 7:
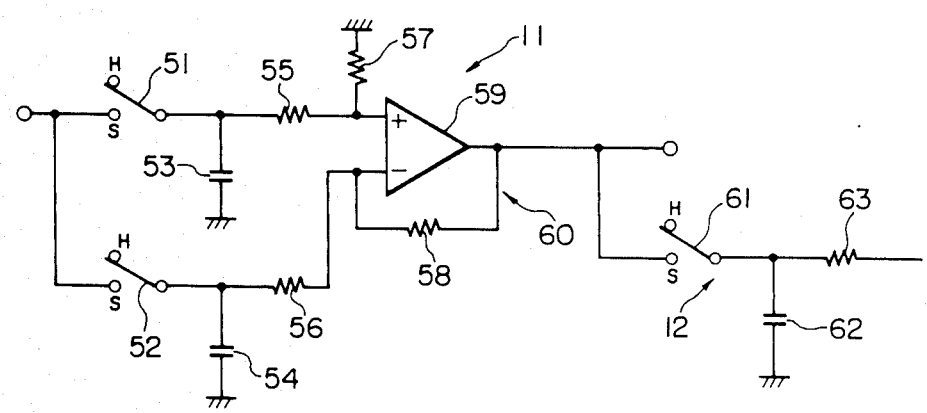
FIG. 7 is a block diagram showing a sample-and-hold circuit used in the servo circuit of FIG. 3.

FIG. 7 shows an example of the first and second S/H circuits 11 and 12 in which, when the timing signals corresponding to front and rear wobbled pits are inputted, switches 51 and 52 are respectively rendered ON, i.e., the movable contacts of the switches 51 and 52 are switched over to contacts S. The switches 51 and 52 otherwise remain OFF, i.e., the movable contacts are held at the contacts H. As a result, the level of the RF signal in the position corresponding to the two wobbled pits are sampled and held on capacitors 53 and 54, respectively. The voltages developed across the capacitors 53 and 54 are applied to the noninverting and inverting input terminals of an operational amplifier 59 through resistors 55 and 56, respectively. The operational amplifier 59 together with resistors 57 and 58, functions as a differential amplifier 60 which outputs a difference signal determined from the difference between the two holding voltages on the two capacitors 53 and 54. This difference signal is indicative of the tracking error signal.

As indicated in FIG. 9A, the switches 51 and 52 of the first S/H circuit 11 are rendered ON (for sampling) in the wobbled pit region (S) and OFF (for holding) in the region (H). On the other hand, as indicated in FIG. 9B, a switch 61 of the second S/H circuit 12 is rendered ON at a predetermined timing, i.e., the movable contact is switched over to the contact S when the switches 51 and 52 are in holding states, and remain OFF for other regions (H), i.e., the movable contact is at the contact H. In this manner, the tracking error signal outputted from the first S/H circuit 11 is sampled and held on the capacitor 62 and outputted through a resistor 63.

Figure 5:
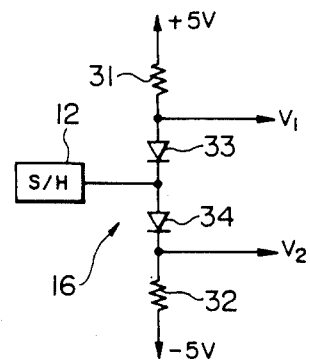
FIG. 5 is a block diagram showing a reference level producing circuit used in the servo circuit of FIG. 3.

The held output of the second S/H circuit 12 is applied to the input of a reference level producing circuit 16. In the latter circuit, as exemplified in FIG. 5, the output of the second S/H circuit 12 is supplied to a junction point between diodes 33 and 34 of a series-connected circuit composed of resistor 31, diodes 33 and 34 and resistor 32. Therefore, the anode of the diode 33 remains at a voltage $V_1$ higher than the held voltage by the voltage drop of the diode 33 (above 0.6 V), and the cathode of the diode 34 remains at a voltage $V_2$ lower than the held voltage by the voltage drop of the diode 34 (about 0.6 V). Accordingly, reference voltages $V_1$ and $V_2$ vary corresponding to the held voltages.

The reference voltages $V_1$ and $V_2$ outputted by the reference level producing circuit 16 are applied to an input of a window comparator 17 where the tracking error signal outputted from the first S/H circuit 11 is compared with the reference voltages $V_1$ and $V_2$. The window comparator 17 outputs either a low-level signal when the level of the tracking error signal is within a range between the reference voltages $V_1$ and $V_2$, or a high-level signal when the level of the tracking error signal is outside the range between the reference voltages $V_1$ and $V_2$.

Figure 6:
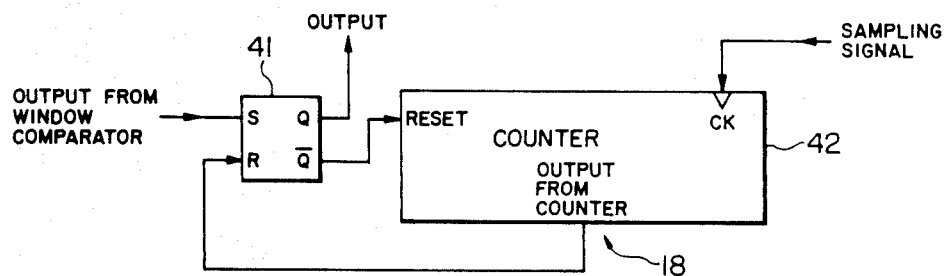
FIG. 6 is a block diagram showing a number setting circuit used in the servo circuit of FIG. 3.

The output of the window comparator 17 is inputted to a number setting circuit 18, the circuit arrangement of which is exemplified in FIG. 6. When the output of the window comparator 17 changes from a low level to a high level, an R-S flip-flop 41 is set and a high-level signal is outputted from the Q output of the flip-flop 41. The $\overline{Q}$ (inverted) output of the flip-flop 41 is supplied to the reset terminal of a counter 42 to reset the latter when the Q output of the flip-flop 41 changes from a high level to a low level. The counter 42 counts the number of rising edges of the sampling pulses (S) (see FIG. 9B) of the second S/H circuit 12 applied to the clock (CK) terminal of the counter 42, and provides an output when the count value reaches a predetermined number (for example, two). In response to the output from the counter 42, the flip-flop 41 is reset. Accordingly, the flip-flop 41 outputs a high-level signal during a period of time from the occurrence of the output from the window comparator 17 until the time when two sampling pulses are inputted to the second S/H circuit 12.

The output of the number setting circuit 18 is is directed through an OR gate 19 to a switch 14. The switch 14 is changed over to the upper contact in response to a high-level signal from the OR gate 19 and is changed over to the lower contact in response to a low-level signal therefrom. Accordingly, when no output is provided from the window comparator 17 (normal operation), the tracking error signal outputted from the first S/H circuit 11 is supplied through a resistor 13 and the switch 14 to an actuator (not shown).

Figure 1:
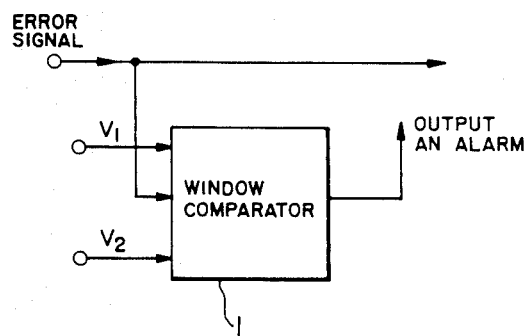
FIG. 1 is a block diagram showing a prior art servo circuit.
Figure 2:
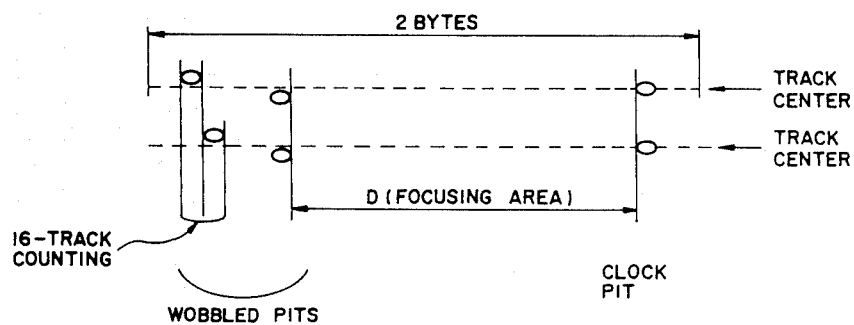
FIG. 2 is an explanatory diagram for explaining a servo byte pattern.
Figure 4:
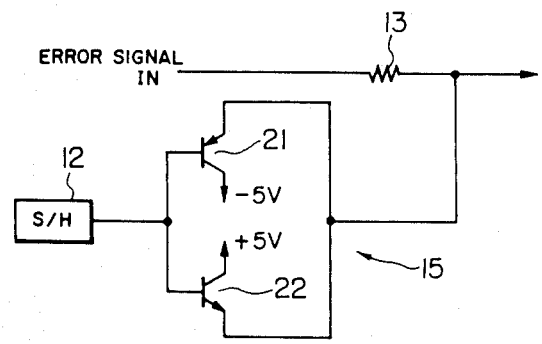
FIG. 4 is a block diagram showing a limiter circuit used in the servo circuit of FIG. 3.

A limiter circuit 15 is connected between the resistor 13 and the second S/H circuit 12. The limiter circuit 15 is, for example, constituted by a parallel circuit of a PNP transistor 21 and an NPN transistor 22, as shown in FIG. 4. The emitters of the transistors 21 and 22 are connected to a resistor 13 and the bases of these two transistors are connected to the second S/H circuit 12.

As a result, either the transistor 21 or 22 is rendered ON when the voltage across the resistor 13 (the voltage of the tracking error signal) is above or below the holding voltage by the base-emitter voltage (about 0.6 V). The voltage of the tracking error signal is clamped or limited to a level larger or smaller by 0.6 V than the held voltage.

When the window comparator 17 is operated and the switch 14 is changed over to the upper contact in response to a high-level signal fed from the OR gate 19, the held voltage in the second S/H circuit 12 is outputted through the switch 14 to the actuator. The output of the OR gate 19 is further applied to the second S/H circuit 12, in which switch 61 is changed over to the contact H in response to a high-level signal from the the OR gate 19 and the holding operation is maintained until the low-level signal is inputted.

The tracking error signal outputted from the switch 14 is as shown by a solid line E in FIG. 9C. Specifically, although the tracking error signal substantially varies in a stepwise manner corresponding to the servo blocks, the tracking error signal is clamped to a level $V_1$ or $V_2$ in accordance with the operation of the limiter circuit 15 when the level of the tracking error signal exceeds the reference voltage $V_1$ or falls below the reference voltage $V_2$, so that the signal indicated by a dotted line $E_1$ is not outputted. When the error voltage exceeds the reference voltages $V_1$ and $V_2$, the held voltage of the immediately preceding servo block is outputted until two subsequent sampling pulses have been detected (that is, two servo block regions later). Consequently, substantially no external disturbances caused by defects on the disk are introduced into the servo loop.

The reference voltages $V_1$ and $V_2$ (defining the window width) are determined in order to agree with the maximum changing width considered to be normal in one servo block (one sample) region (about 24 microseconds). However, since this changing width occurs within a comparatively short period of time, the reference voltages $V_1$ and $V_2$ are sufficiently small values. Hence, the detection of defects is ensured before the actuator can be greatly displaced, and the error signal can be quickly corrected.

When an abnormality of the sync signal is detected (for example, when there is no sync signal detected in a certain servo byte region), a detection signal is applied to the OR gate 19, thereby accomplishing a protection operation as described above.

Although in the first embodiment the invention is applied to a servo circuit operating in response to a tracking error signal, it is also possible to apply the invention to servo circuits operating in response to a focus error signal, a cross track signal produced corresponding to a detection signal for clock pits, or an output signal of a low-pass filter constituting a PLL circuit. Moreover, the invention is not limited to a sample type servo, and can be applied to a successive type servo by prior sampling of the error signal.

As described above, according to the first embodiment of the invention, operation defects can quickly be detected and an accurate servo operation can be maintained without being affected by defects. Accordingly, this embodiment is particularly advantageous in cases when the optical disk is rotated at a high speed (1,800 r.p.m.) and a wide servo band width of kilohertz is employed since the servo system is little affected by internal disturbance such as when the servo band is broadened.

Figure 10:
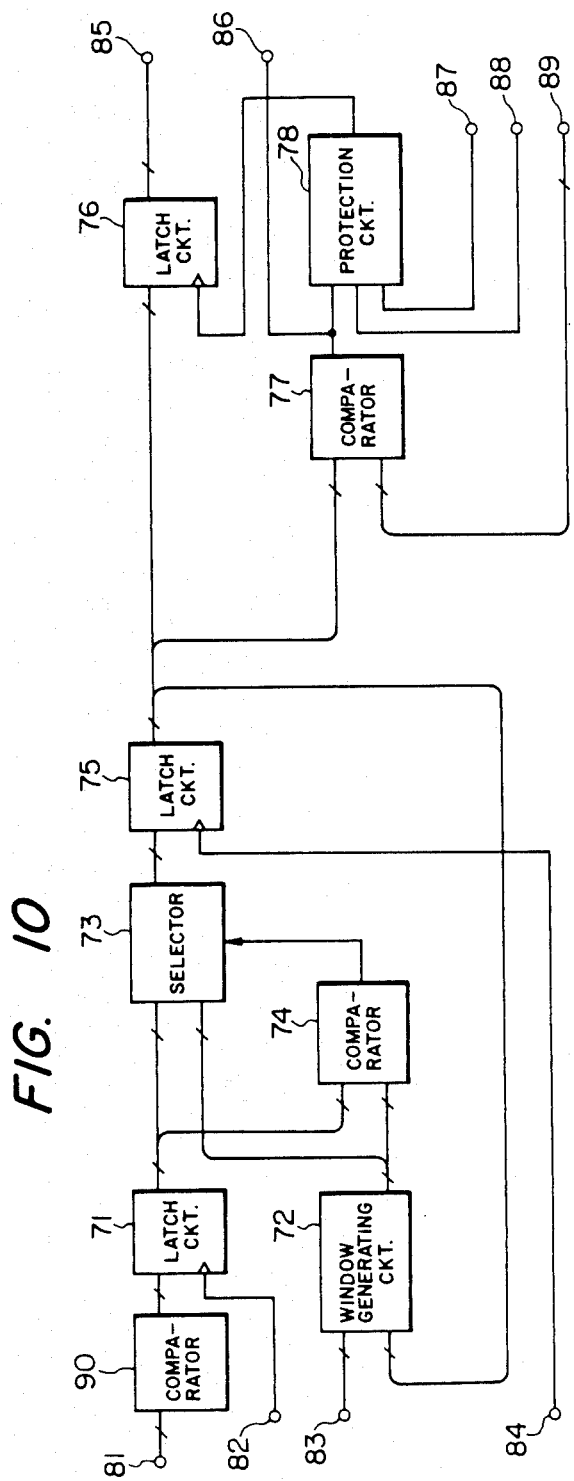
FIG. 10 is a block diagram showing a tracking circuit according to the present invention.

A second embodiment of the present invention will next be described with reference to FIGS. 10 and 11. FIG. 10 is a block diagram showing a tracking circuit. Two RF signals corresponding to the wobbled pits in the respective servo byte region are applied to a terminal 81 and compared in a comparison circuit 90 to produce a signal representing the difference between the level of these two signals. The difference signal is input to a first latch circuit 71, latched in response to clock pulses supplied from a terminal 82 and then supplied to a comparator circuit 74.

Figure 11:
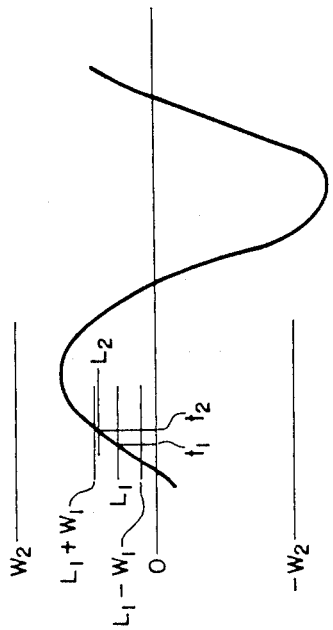
FIG. 11 is a waveform diagram of a tracking error signal.

A second latch circuit 75 latches the previous sampling value (a value $L_1$ at a time instant $t_1$ in FIG. 11). A window generating circuit 72 adds (or subtracts) a window data of a predetermined width ($\pm W_1$) supplied from a terminal 83 to (or from) the latched value $L_1$ to thereby produce a window value having a predetermined width ($L_1 \pm W_1$). A comparator 74 compares this window value with the current sampling value (a value $L_2$ at a time instant $t_2$ in FIG. 11) latched in the first latch circuit 71, and the resulting signal is outputted to a selector 73, which is switched in response to the output of the first comparator 74. Sampling value $L_2$ is selected when the latter value is within the range of the window value ($L_1 \pm W_1$) and the window value ($L_1 + W_1$) or ($L_1 - W_1$), whichever is closer to the sampling value $L_2$, is selected when the sampling value $L_2$ is outside the range of the window ($L_1 \pm W_1$). Specifically, the sampling value is selected when it is within the range of the window, but limited by the window value when it is outside the window.

The value selected by the selector 73 is inputted to a second latch circuit 75 and latched therein in response to clock pulses supplied from a terminal 84. The output of the second latch circuit 75 is supplied to a second comparator 77 to which a reference value ($\pm W_2$) is supplied from a terminal 89. When the output (a value $L_2$) of the second latch circuit 75 is larger than the reference value (absolute value) $W_2$ or smaller than $-W_2$, the second comparator 77 generates an alarm signal on a terminal 86. A protection circuit 78 interrupts clock pulses from being applied to a third latch circuit 76. Accordingly, the third latch circuit 76 outputs the previous sampling value $L_1$ directly to a terminal 85.

The protection circuit 78 prohibits the latching operation of the third latch circuit 76 when a signal indicative of synchronization is inputted from a terminal 87.

When the output of the second latch circuit 75 is larger than the reference value $-W_2$ and is smaller than $W_2$, the protection circuit 78 outputs the clock pulses supplied from the terminal 88 to the third latch circuit 76. As a result, the sampling value $L_2$ outputted by the second latch circuit 75 is latched in the third latch circuit 76 and outputted therefrom.

As described above, according to the second embodiment of the invention, since the current sampling value is compared with a window having a predetermined width with the previous sampling value as a center and is further compared with a reference value, the width of the window can be set to relatively small value and the reference value can be set to a larger value. Therefore, a track of large eccentricity can be traced while limiting abrupt changes of the tracking error signal caused by noise or the like. Further, it is possible to prevent the tracking condition from being gradually largely changed.

What is claimed is:

1. A servo circuit for generating a tracking error signal comprising:
   first comparison means for comparing RF signals from a pair of wobbled pits and generating a difference signal representing a difference in levels of the RF signals;
   holding means for holding said difference signal for a predetermined period;
   reference level producing means for setting a reference level having a predetermined range defined by two edge levels and having as a center level the level of a previously sampled difference signal from said holding means;
   second comparison means for comparing the level of a presently sampled difference signal, from said first comparison means, with said reference level and for outputting a first signal representing the comparative result; and
   selecting means for selecting and outputting, as a tracking error signal, only one of said presently sampled difference signal and a second signal having a level within said range of said reference level in accordance with said comparative result, so that said presently sampled difference signal is selected when the level of said presently sampled difference signal is within the range of said reference level, and so that said second signal is selected when said presently sampled difference signal is out of the range of said reference level.

2. A servo circuit as claimed in claim 1, said servo circuit further comprising a sample-and-hold means for sampling said RF signals from said wobbled pits, for holding said sampled RF signals and for outputting said held sampled RF signals to said first comparison means.

3. A servo circuit as claimed in claim 2, said servo circuit further comprising a timing signal generation means for generating timing signals and for applying said timing signals to said sample-and-hold means and to said holding means to cause said sample-and-hold means and said holding means to perform sampling-and-holding operations.

4. A servo circuit as claimed in claim 3, said servo circuit further comprising a limiter-circuit means for clamping the level of said presently sampled difference signal to one of said two edge levels of said range when said level of said presently sampled difference signal is out of said range, said limiter-circuit means having one terminal connected to an output terminal of said holding means and another terminal connected to said sample-and-hold means through a resistor.

5. A servo circuit as claimed in claim 3, said servo circuit further comprising a number setting means for outputting a high level signal to said selecting means for a period corresponding to a predetermined number of timing signals applied to said holding means, in response to a change in said first signal from a low level to a high level, so that said selecting means selects and outputs said previously sampled difference signal for the period when said high level signal is outputted from said number setting means.

6. A servo circuit as claimed in claim 1, said servo circuit further comprising:
   second comparison means for comparing an output of said selecting means with one of two predetermined reference levels having same absolute value and opposite polarities and for outputting an alarm signal when said output exceeds said one of said predetermined reference levels, positively or negatively;
   latch means for latching said output of said selecting means; and
   protection means for prohibiting the input of a clock signal to said latch means in response to said alarm signal and for causing said latch means to output a previously latched output of said selecting means.

7. A servo circuit as claimed in claim 6, wherein the level of said second signal is set to one of said edge levels of said reference level.

* * * * *